US009101245B2

(12) United States Patent
Rey et al.

(10) Patent No.: US 9,101,245 B2
(45) Date of Patent: Aug. 11, 2015

(54) BEVERAGE DISPENSER WITH IMPROVED OUTLET TUBES ASSEMBLY (71) Applicant: NESTEC S.A., Vevey (CH)

(72) Inventors: Cedric Rey, La Sarraz (CH); Roberto Angelo Calderone, Orbe (CH); Lucio Scorrano, Yverdon-les-Bains (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/362,343

(22) PCT Filed: Dec. 12, 2012

(86) PCT No.: PCT/EP2012/075212
§ 371 (c)(1),
(2) Date: Jun. 2, 2014

(87) PCT Pub. No.: WO2013/087686
PCT Pub. Date: Jun. 20, 2013

(65) Prior Publication Data
US 2014/0332561 A1 Nov. 13, 2014

(30) Foreign Application Priority Data

Dec. 15, 2011 (EP) .................................... 11193789

(51) Int. Cl.
*B67D 7/78* (2010.01)
*A47J 31/40* (2006.01)
*A47J 31/46* (2006.01)
(52) U.S. Cl.
CPC ................ *A47J 31/401* (2013.01); *A47J 31/46* (2013.01)
(58) Field of Classification Search
CPC ........ A41J 31/46; A41J 31/462; A41J 31/401
USPC ................. 222/154.5, 173, 129.1–129.4, 132
See application file for complete search history.

(56) References Cited

U.S. PATENT DOCUMENTS 3,703,187 A * 11/1972 Booth ........................... 137/114
6,868,988 B2 * 3/2005 Ufheil et al. ................ 222/129.1
(Continued)

FOREIGN PATENT DOCUMENTS

FR       2640865      6/1990
JP       2008168113   7/2008
WO       2005063093   7/2005

*Primary Examiner* — Lien Ngo
(74) *Attorney, Agent, or Firm* — K&L Gates LLP (57) ABSTRACT

The invention concerns a beverage dispenser comprising: at least one beverage ingredient processing assembly (1a, 1b, 1c) presenting one outlet (2a, 2b, 2c) for evacuating a beverage, at least one conduit (8a, 8b, 8c) removably connected to the outlet (2a, 2b, 2c) of the at least one beverage ingredient processing assembly for dispensing the beverage in a container (9), wherein: the dispenser comprises a drawer assembly (3) comprising a drawer (4) composed of an upper part (4a) and a lower part (4b), said both parts being at least partly removable one from the other, at least one of said parts presenting at least one groove (50a, 50b, 50c, 51a51a, 51 b, 51c) on its internal surface so that when the two parts are connected together the at least one groove forms at least a part of the least one conduit (8a, 8b, 8c) for dispensing the beverage from the beverage ingredient processing assembly outlet (2a, 2b, 2c) to the container (9), and the upper part (4a) and the lower part (4b) of the drawer assembly are made of a first hard material, and a second soft polymer material (20) covers the upper part (4a) and/or the lower part (4b) at least on the area near from the edges of the at least one conduit (8a, 8b, 8c) formed by the at least one groove, and the drawer assembly (3) comprises a cover (6) for maintaining and squeezing the upper part and the lower part one against the other.

16 Claims, 7 Drawing Sheets

(56) References Cited

U.S. PATENT DOCUMENTS

| | | | |
|---|---|---|---|
| 7,063,238 B2 * | 6/2006 | Hale | 222/325 |
| 8,245,739 B1 * | 8/2012 | Wade et al. | 141/94 |
| 9,049,962 B2 * | 6/2015 | Verhoeven et al. | 1/1 |
| 2012/0006204 A1 * | 1/2012 | Eidenschink et al. | 99/279 |
| 2012/0111887 A1 * | 5/2012 | Smeller et al. | 222/129.1 |

* cited by examiner

BEVERAGE DISPENSER WITH IMPROVED OUTLET TUBES ASSEMBLY

CROSS REFERENCE TO RELATED APPLICATIONS

The present application is a National Stage of International Application No. PCT/EP2012/075212, filed on Dec. 12, 2012, which claims priority to European Patent Application No. 11193789.2, filed Dec. 15, 2011, the entire contents of which are being incorporated herein by reference.

FIELD OF THE INVENTION

The present invention relates to a beverage dispenser comprising means for preparing and evacuating a beverage and presenting easily cleanable evacuating means.

BACKGROUND OF THE INVENTION

Many beverages like espresso and other coffee beverages, milk beverages, chocolate beverages, . . . are often prepared by mixing a soluble beverage powder or a liquid beverage concentrate with a diluent. Mixing devices are known for speedier preparation of such beverages by mixing the soluble beverage ingredient with the diluent, such as water. These devices typically comprise a mixing chamber in which the soluble component and the diluent are fed. The diluent can be introduced into the mixing chamber in order to create a whirlpool to efficiently dissolve the soluble component in the hot diluent. The hot diluent can also be introduced under the form of jets that provides mixing, dissolving and frothing. The mixture can also eventually be frothed by a whipper in a whipping chamber to reconstitute the beverage and produce foam. The beverage is then usually evacuated from the mixing chamber through the bottom of the mixing chamber and dispensed into a receptacle for drinking.

One dispenser can sometimes comprise different mixing devices each one being specifically designed for the mixing of a particular soluble beverage ingredient with the diluent. For example, a dispenser can comprise three mixing devices one devoted to coffee mixing, one to milk mixing and one to chocolate mixing. This separation is required for avoiding taste contamination of the mixing device and also because for each beverage ingredient a specific mixing device is usually associated, this specific mixing device enabling an optimized dissolution and eventually frothing of the specific beverage. For each mixing device the beverage is usually evacuated through a tube, generally a flexible tube, until a container like a cup.

The internal parts of the dispenser that are in contact with the diluted beverage ingredient must be regularly cleaned to avoid the growth of bacteria due to residues of beverages in the machine. The cleaning is also necessary because residues of powders can partially clog the outlet of the mixing chamber disturbing the correct dispensing of beverages. The cleaning usually concerns at least the dissolution chamber, the whipping chamber and the evacuation tubes. For cleaning operation, these parts must be dismantled, then cleaned and then reassembled. This operation takes time and it must done by people that have been trained for the disassembling and the reassembling to avoid errors and further failure in the beverages production. When the dispenser comprises several mixing devices and several evacuation tubes the disassembling and the reassembling becomes even more complicated and the cleaning step longer. Moreover the cleaning of flexible tubes must be realized with a bottle brush and is often difficult to do in an efficient manner. Usually this cleaning is made by an operator dedicated to the maintenance of the beverages production machines. But now there is need for decreasing the time for the cleaning operation to limit the period of time during which the dispenser is not operable. There is also a need to reduce the costs for cleaning operation and having this operation made by any non trained person so that it is not necessary to ask a specific operator to come and clean the machine. The cleaning should be made by any person briefly trained on the cleaning operations. The cleaning should be made by any person briefly trained on the cleaning operations. Presently the operator turnover in fast food restaurants is so high that new operators must be trained every week. Consequently there is a need for dispensers that can be easily cleaned and presenting such a structure that the operator is forced to clean all critical parts of the dispenser. This cleaning operation must also be so short that it can be made more often depending on the nature of the beverage ingredients.

One aim of the present invention is to solve these problems and to propose a beverage dispenser comprising at least one mixing assembly or other beverage processing means of which evacuation means can be easily, rapidly and efficiently dismantled and cleaned.

As mentioned herabove the mixing devices of the dispenser usually evacuate the beverages through a tube, generally a flexible tube, until a drinking cup. The flexible tube presents the interest of providing full air tightness between the mixing devices outlet until the point of delivery in the drinking cup. This air tightness is of paramount importance for retaining the foam quality of the beverage prepared in the mixing unit, particularly when the beverage is an espresso coffee. The coffee crema quality obtained at the outlet of the mixing device must be delivered in an intact way.

Consequently another aim of the present invention is also to propose a beverage dispenser comprising at least one mixing assembly of which evacuation means can be easily, rapidly and efficiently dismantled and cleaned and of which evacuation means are leakproof.

Another aim of the present invention is also to propose a beverage dispenser comprising several mixing assemblies and of which evacuation means is optimized in terms of spatial arrangement and cleaning.

SUMMARY OF THE INVENTION

The invention concerns a beverage dispenser comprising:
at least one beverage ingredient processing assembly presenting one outlet for evacuating a beverage,
at least one conduit removably connected to the outlet of the at least one beverage ingredient processing assembly for dispensing the beverage in a container,
wherein:
the dispenser comprises a drawer assembly comprising a drawer composed of an upper part and a lower part, said both parts being at least partly removable one from the other, at least one of said parts presenting at least one groove on its internal surface so that when the two parts are connected together the at least one groove forms at least a part of the conduit for dispensing the beverage from the beverage processing assembly outlet to the container, and
the upper part and the lower part of the drawer assembly are made of a first hard material, and
a second soft polymer material covers a part of the internal surface of the upper and/or the lower part so that when the two parts are connected and squeezed together the part of the least one conduit formed by the at least one groove is liquid and air tight, the drawer assembly comprises a cover for maintaining and squeezing the upper part and the lower part one against the other.

The dispenser of the present invention comprises one beverage ingredient processing assembly, said assembly comprising one device for contacting a beverage ingredient with a diluent. In the dispenser of the present invention different types of assemblies differing by the devices for contacting the beverage ingredient with the diluent can be implemented. The device for contacting the beverage ingredient with the diluent can be comprised in the list of: a jet(s) head, a mixing chamber, a whipper, a mixing assembly, a brewing chamber or combinations of said devices.

The jet(s) head can be a nozzle delivering at least one jet of diluent in a chamber configured for receiving a dose of beverage ingredient.

The mixing chamber can be a chamber configured to receive the diluent and a dose of beverage ingredient. It can be designed so as to make an efficient contact of the beverage ingredient and the diluent and improve the dissolution of a soluble beverage ingredient.

The whipper is configured to whip a mixture of the diluent and the beverage ingredient so as to make it foam. The whipper is usually combined with a mixing chamber configured to receive and mix the diluent and the beverage ingredient before the mixture is whipped.

The brewing chamber can be a chamber configured to receive an infusable beverage ingredient and water. In the brewing process, the heated water infuses and extracts flavours from the brewing substance. The brewing chamber can contain a filter to allow beverage to drain from the infused beverage ingredient and water mixture It can be configured to be hermetically closed to receive and hold the diluent under pressure and to retain the infusable beverage ingredient. The infusable beverage ingredient can be roast and ground coffee, tea leaves, herbs, botanicals, as well as other substances.

According to the preferred embodiment the beverage ingredient processing assembly is a mixing chamber in which a diluent and at least one beverage ingredient can be introduced and mixed. This mixing chamber is generally operably associated with a diluent supply and eventually a device for dosing the at least one beverage ingredient. The mixing chamber is preferably combined with a whipper for whipping the mixture of diluent and beverage ingredient. According to the invention, the dispenser can comprise one or several mixing assemblies. According to said preferred embodiment the dispenser preferably comprises several mixing chambers dedicated to the mixing of different soluble beverage ingredients, in particular soluble coffee, soluble milk, soluble chocolate and eventually soluble tea and dehydrated soup.

The drawer assembly of the dispenser is composed of upper and lower parts that are removable one from the other, at least one of them presenting at least one groove on its internal surface. By internal surface it is meant the surface of the upper—respectively the lower—part that faces the lower—respectively the upper—part when the drawer is positioned in the dispenser in dispensing operating conditions. According to the invention either only one part of the drawer can present the at least one groove—the upper or the lower part—or the two parts can present the at least one groove. In this last case, the two parts of the drawer preferably present grooves that face each other when the two parts are connected together. According to a less preferred mode of the invention the two parts can also present grooves that do not face each other and that create different conduits when the both parts are connected. The grooves in each part of the drawer are designed so that when the two parts are connected together the grooves form at least one conduit for dispensing the beverage mixture from the at least one mixing assembly outlet to the container. According to one preferred embodiment, only the lower part presents at least one groove. According to another preferred embodiment each of the lower part and the upper part presents at least one groove, the at least one upper and lower grooves facing each other when the drawer is assembled and the at least one groove in the bottom part is deeper than the at least one groove in the upper part.

According to the preferred embodiment, the lower part of the drawer comprises the outlet of the at last one conduit formed by the at least one groove.

According to another preferred embodiment, the lower part of the drawer comprises the inlet of the at last one conduit formed by the at least one groove.

The upper part and the lower part of the drawer assembly are made of a first hard material. This hard material can be selected in the list of: metal, ceramic, polymer. Moreover a second soft polymer material covers the upper part and/or the lower part at least on the area near from the edges of the at least one conduit formed by the at least one groove. This second soft polymer material can be selected in the list of: thermoplastic elastomer (TPE), silicone. TPE are preferred because these materials can be injected and consequently a more precise positioning on the edges of the grooves can be obtained. Generally the second soft polymer material covers the upper part and/or the lower part at least on the area near from the at least one conduit formed by the at least one groove. The area of the first material covered by the second soft polymer material usually corresponds to the edges of the at least one groove present in the upper and/or lower part. Depending if the upper and the lower part both present at least one groove corresponding one to the other, then the second soft polymer material can cover only the upper or only the lower part at the edge of the groove.

According to one preferred embodiment, the second soft polymer material can cover only the lower part—respectively the upper part—and the upper part—respectively the lower part—can present bumps of hard material that can fit in the soft plastic material of the lower part—respectively the upper part. The second soft polymer material covers the bottom and/or upper drawer part internal surface(s) so that when the two parts are squeezed together liquid and air tightness conduits are formed.

In practice, the second material is deposited on the first material surface to cover it. The second material can be deposited on an area bigger than the area near from the edges of the groove forming the conduit. According to the preferred embodiment, the internal surface of the at least one groove is not covered by the second soft polymer. Actually the first hard material is easier to clean and brush than the second soft polymer material. According to one embodiment, the second soft polymer material can cover all the surface of the upper part and/or the lower part except the area corresponding to the conduit formed by the at least one groove.

Lastly the drawer assembly comprises a cover for maintaining and squeezing the upper part and the lower part one against the other. Due to the soft property of the second material, the squeezing of the upper and lower parts one against the other leads to the deformation of the second material and creates tightness so that so that no fluid can leak out of the conduit(s) formed by the two drawer parts when they are connected and so that air tightness is reached.

In the present text, by hard material it should be understood that the material is rigid and non deformable. By soft material, it should be understood that the material is resiliently deformable when a pressure is applied on it, in particular when the hard material is pressed against it.

Preferably the cover presents means for removable attachment to the drawer. The drawer can present two lateral pins and the cover can present two notches configured for cooperating with the two pins when the drawer assembly is assembled.

Preferably the dispenser comprises a receiving area for positioning the drawer assembly in the dispenser. Accordingly the drawer is removable from the dispenser according to a linear sliding movement. The receiving area is usually configured for automatically connecting the drawer assembly to the outlet of the at least one mixing assembly when the drawer is correctly positioned in the receiving area. The dispenser can further comprise detachable connection means for fixing the drawer assembly in the receiving area. Said detachable connection means can be configured for squeezing the drawer assembly against the outlet of the at least one mixing assembly. Preferably the outlet of the at least one mixing assembly and/or the inlet of the at last one conduit formed in the drawer is covered by a soft polymer material. Consequently when the drawer assembly is squeezed against the outlet(s) of the at least one mixing assembly, a tightness connection is established between said outlet(s) and the conduit(s) in the drawer. Said detachable connection means can be a handle that is pivotably mounted to the frame of the dispenser at two symmetric pivot points. The handle is preferably configured for engaging the front part of the drawer.

In the present application, the terms "lateral", "front", "back", "top" or "upper" and "bottom" or "lower" are used to describe the relational positioning of features of the invention. These terms should be understood to refer to the drawer assembly in its normal orientation when inserted in the beverage dispenser as shown for example in FIG. 2.

BRIEF DESCRIPTION OF THE DRAWINGS

The characteristics and advantages of the invention will be better understood in relation to.

DETAILED DESCRIPTION OF THE DRAWINGS

Figure 1:
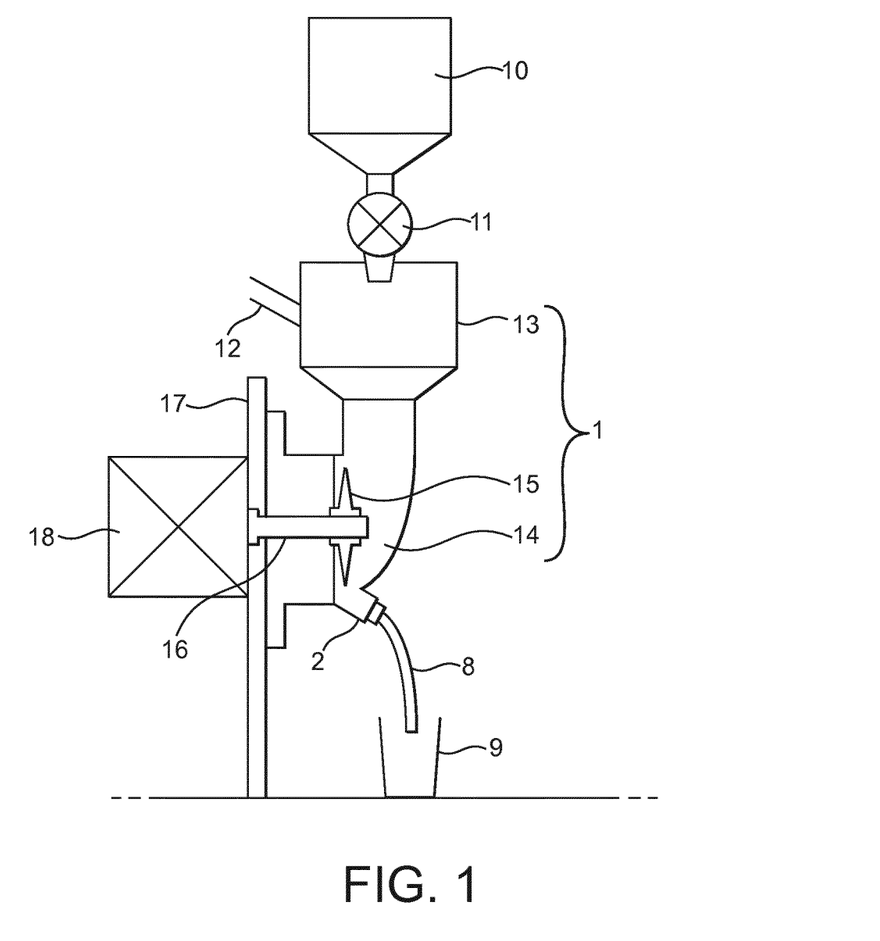
FIG. 1 depicts a current beverage dispenser with a mixing assembly according to the prior art.

FIG. 1 illustrate a beverage dispenser of the prior art comprising a mixing assembly. The beverage dispenser comprises a beverage ingredient storing unit 10 connected to a dosing unit 11 able to provide beverage ingredient doses to a mixing chamber 13. The beverage ingredient can be any ingredient that forms a beverage when mixed with a liquid diluent. It can be a soluble powder or a soluble liquid concentrate like for example coffee, decaffeinated coffee, dehydrated culinary products, tea, chocolate or milk. When different storing units are present, they preferably contain different beverage ingredients.

In the illustrated embodiment, each of the dosing devices is placed at the bottom of the storing units to receive the powder therefrom by gravity. The dose of beverage ingredient issued from the dosing unit 11 is delivered to the mixing chamber 13 where it is mixed with a diluent, usually water, introduced from a diluent inlet 12. The shape of the chamber 13 and the orientation of the diluent inlet 12 can be such that the diluent creates a sufficiently turbulent stream that helps the dissolution of the beverage ingredient in the diluent in the chamber. Then the mixture of the dissolved beverage ingredient can be introduced in a whipping chamber 14. In FIG. 1 he whipping chamber 14 comprises a whipper device 15 such as an impeller. The whipper device is connected to a drive shaft 16 fixed to the frame 17 of the dispenser. The drive shaft is actuated by a motor 18. The whipped beverage leaves the whipper chamber 14 through a mixing assembly outlet 2 that is connected to a conduit 8. The conduit delivers the beverage in a container like a cup 9. The conduit 8 is removable from the outlet 2 so as to be cleaned. It generally consists in a flexible tube. When the dispenser comprises several mixing assemblies 1, several conduits 8 are connected to the outlets 2 to deliver the beverages to the cup 9.

The elements identified in FIG. 1 and present in the following figures are referenced with the same numbers.

Figure 2:
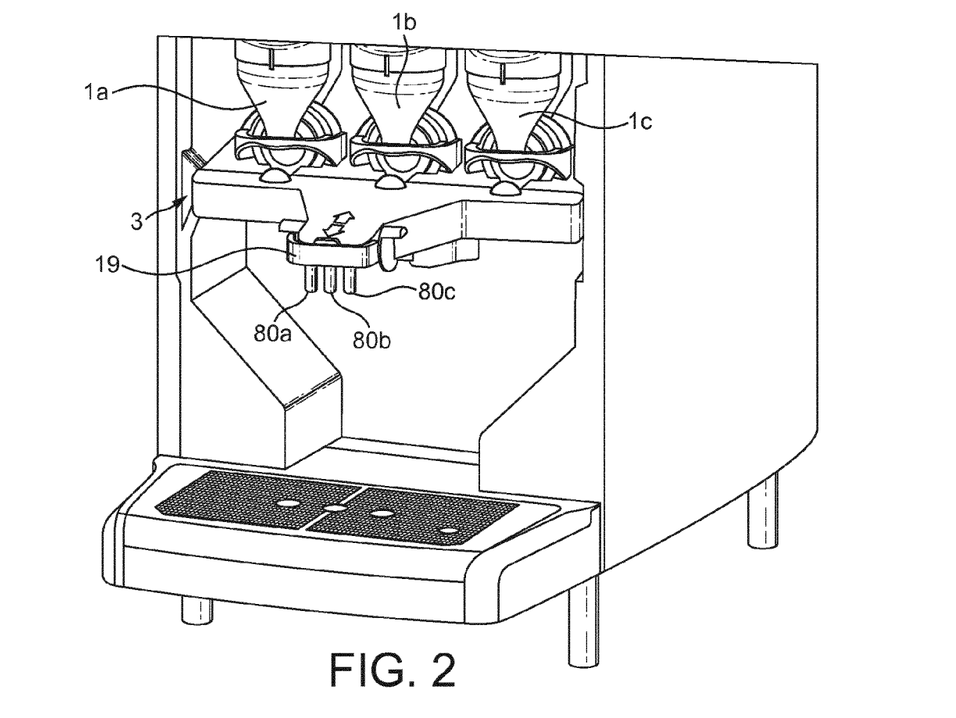
FIG. 2 is a perspective view of the bottom internal part of a dispenser according to the present invention.

FIG. 2 illustrates the bottom part of a dispenser according to the present invention comprising three mixing assemblies 1a, 1b, 1c and a drawer assembly 3 according to the present invention. Each mixing assembly 1a, 1b, 1c is composed of a mixing chamber 13a, 13b, 13c and a whipping chamber 14a, 14b, 14c as better illustrated in FIG. 10 in which the drawer assembly has been removed from the dispenser. Each mixing assembly presents a mixing assembly outlet 2a, 2b, 2c for evacuating the whipped beverage mixture through the drawer assembly 3. The drawer assembly 3 presents three drawer assembly outlets 80a, 80b, 80c evacuating the beverage respectively prepared in each of the mixing assembly 1a, 1b, 1c.

Figure 3:
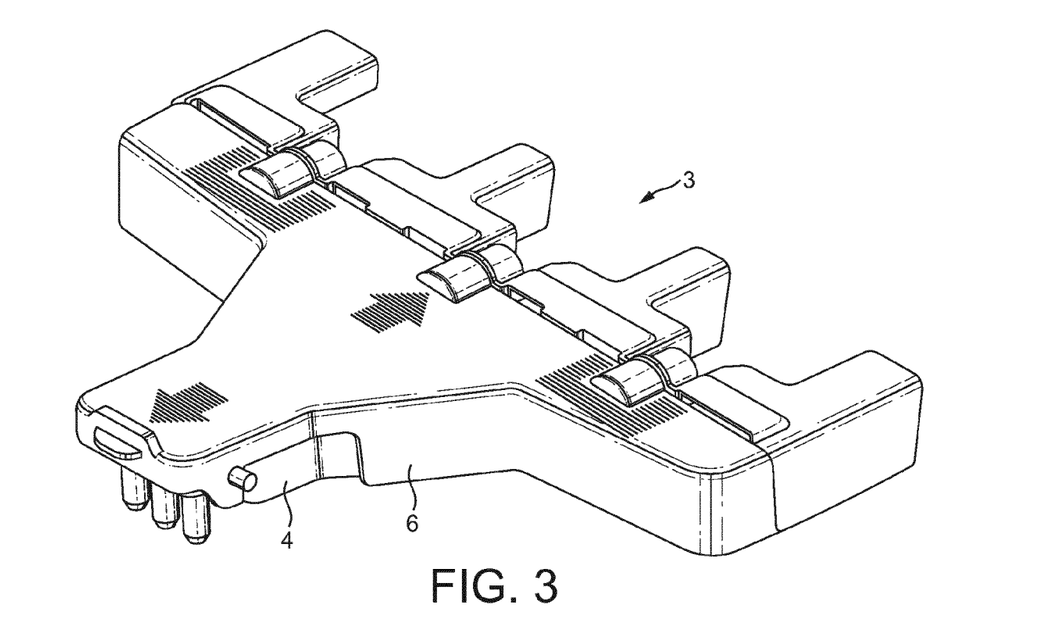
FIG. 3 is a perspective view of the drawer assembly of the dispenser of FIG. 2 that has been removed from the dispenser.

FIG. 3 shows the drawer assembly 3 that has been removed from the dispenser. It comprises a drawer 4 and a cover 6 that envelops the drawer 4.

Figure 4:
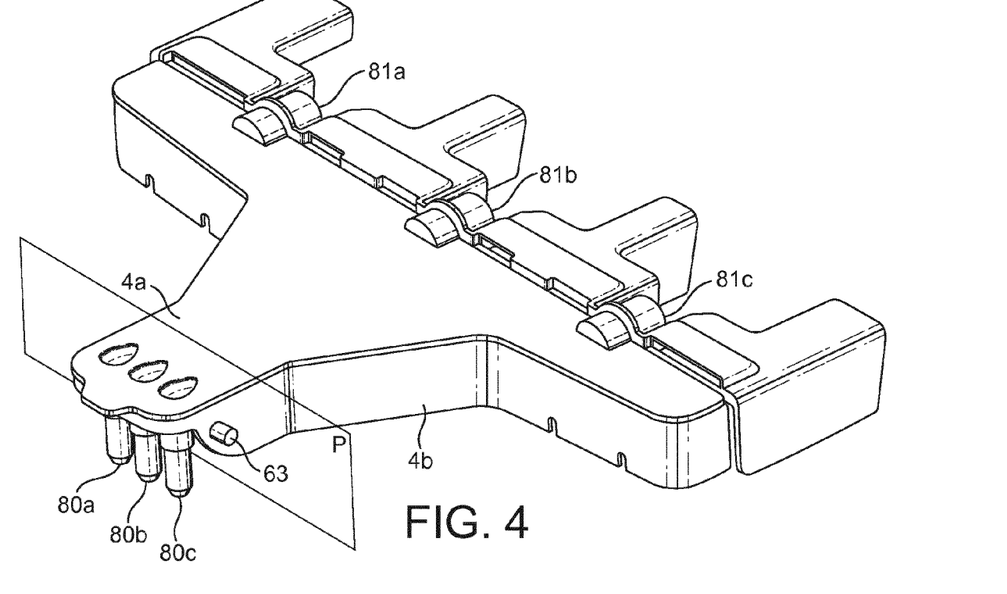
FIG. 4 is a perspective view of the drawer of the drawer assembly of FIG. 3.

FIG. 4 illustrates the drawer 4 from which the cover has been removed. The drawer 4 is composed of an upper part 4a and a bottom part 4b. The drawer hires the conduits that cooperate with the mixing assembly outlets for evacuating the beverages. The drawer presents three drawer assembly inlets 81a, 81b, 81c and three drawer assembly outlets 80a, 80b, 80c for delivering the beverages.

Figure 5:
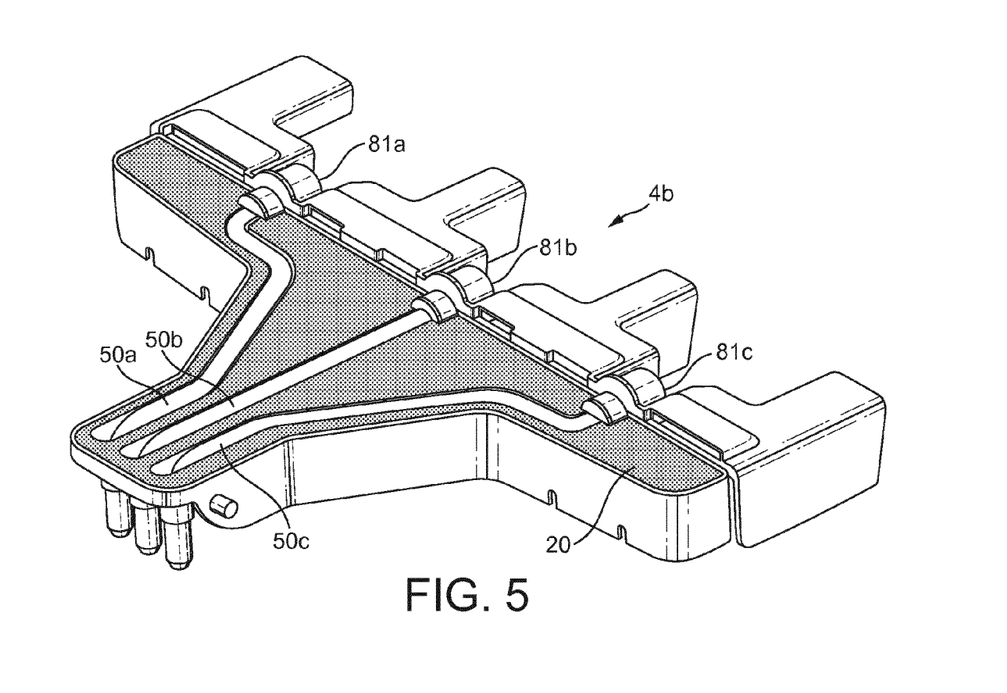
FIGS. 5 and 6 are perspective views of the lower part of the drawer of FIG. 4.
Figure 6:
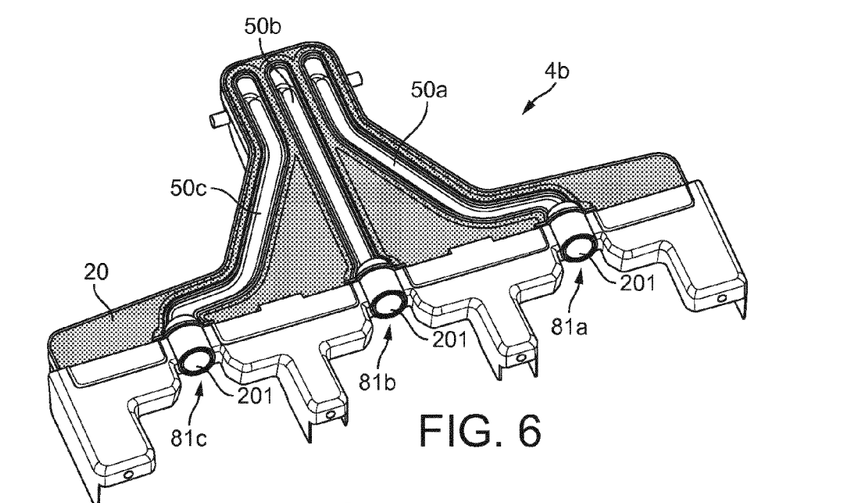
Figure 7A:
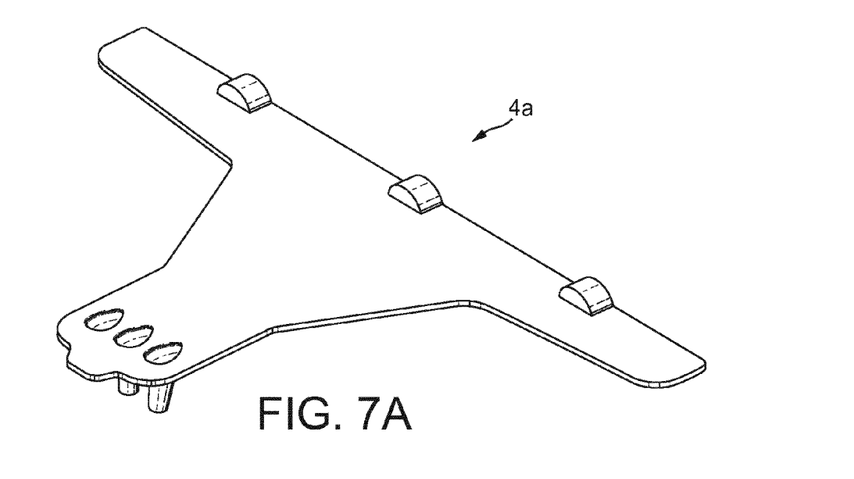
FIGS. 7A and 7B are perspective views of the upper part of the drawer of FIG. 4.
Figure 7B:
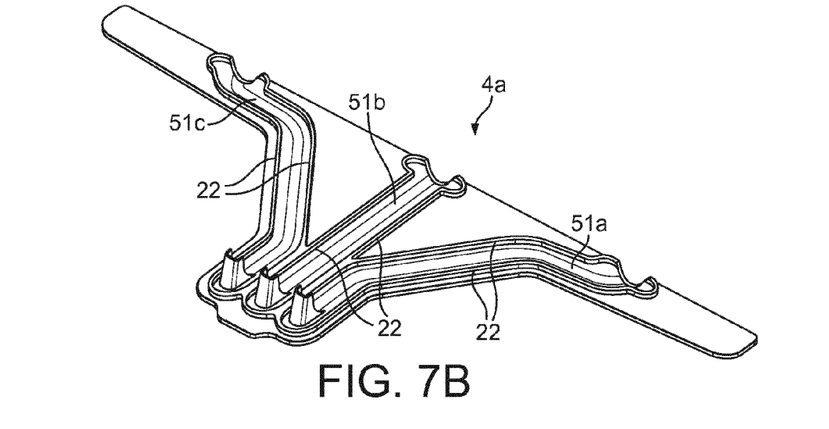
Figure 7C:
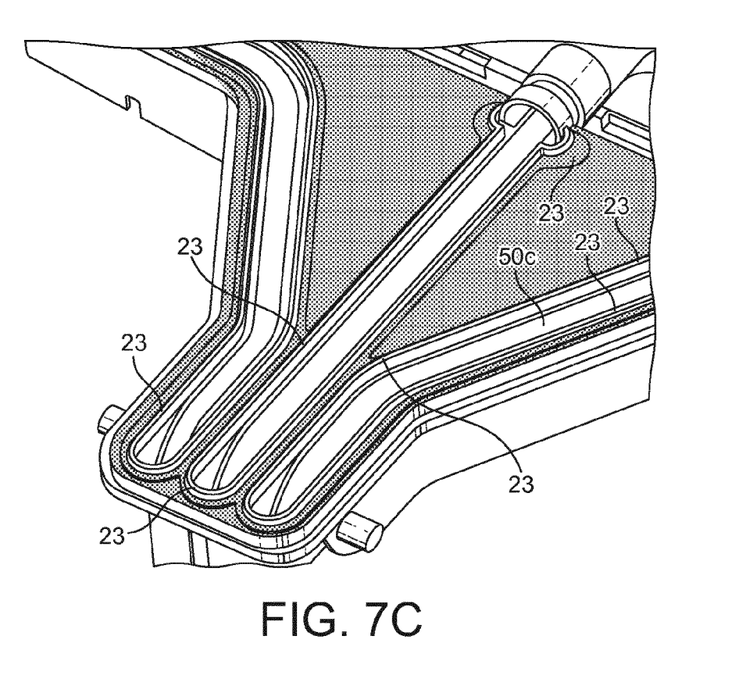
FIG. 7C is a magnified view of FIG. 5.
Figure 8:
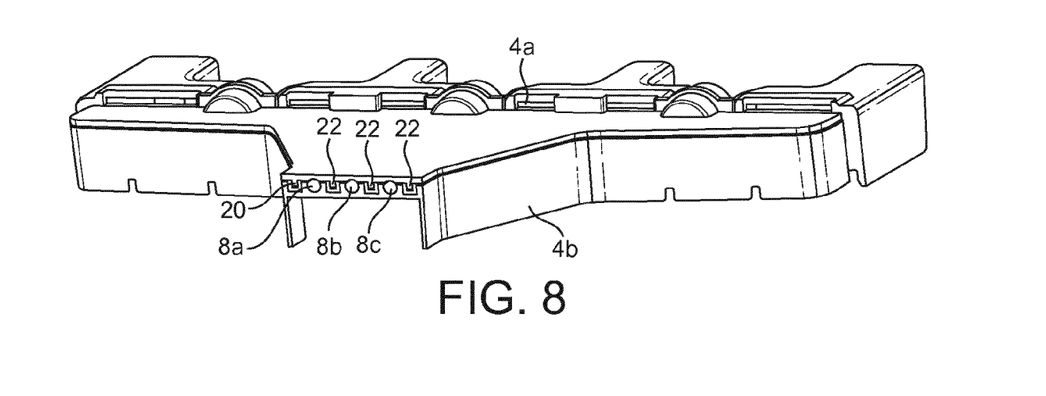
FIG. 8 is section view of the drawer of FIG. 4 according to plan P.

FIGS. 5 and 6 illustrate the bottom part 4b of the drawer and FIGS. 7A and 7B illustrate the upper part 4a of the drawer. The bottom part 4b presents three grooves 50a, 50b, 50c and the upper part 4a present three grooves 51a, 51b, 51c. All these grooves are configured for forming three conduits 8a, 8b, 8c when the upper part and the lower part 4a, 4b of the drawer are positioned one on the other as illustrate in the section view of FIG. 8. The bottom part 4b and the upper part 4a are made of a first hard material. Besides the area near the edges of the grooves 50a, 50b, 50c are covered by a second soft polymer material 20 that covers the first hard material of the bottom part 4b. Due to the soft property of the second material, the squeezing of the upper and lower parts one against the other leads to the deformation of the second material and creates tightness so that no fluid can leak out of the two drawer parts when they are connected and so that air tightness is reached. Besides the hard material of the upper part 4a of the drawer can present bumps 22 that can fit in corresponding slots 23 in the soft plastic material of the lower drawer 4b. These slots 23 are illustrated in FIG. 7C that is a magnified view of FIG. 5. They are placed near from the edges of the grooves 50a, 50b, 50c and follow them around.

FIG. 6 illustrates the back part of the lower part of the drawer: it makes apparent that the lower part comprises the inlets 81a, 81b, 81c of the three conduits 8a, 8b, 8c. The inlets consist in holes pierced in the back part of the lower part of the drawer. The back surface of the three inlets—that is the surface that enter into contact with the mixing assembly outlets—is covered by the soft polymer material so that when the drawer is pushed against the mixing assembly outlets a tight connection is obtained. FIGS. 5 and 6 also make apparent that the bottom part 4b comprises the outlets 80a, 80b, 80c of the three conduits 8a, 8b, 8c.

Figure 9A:
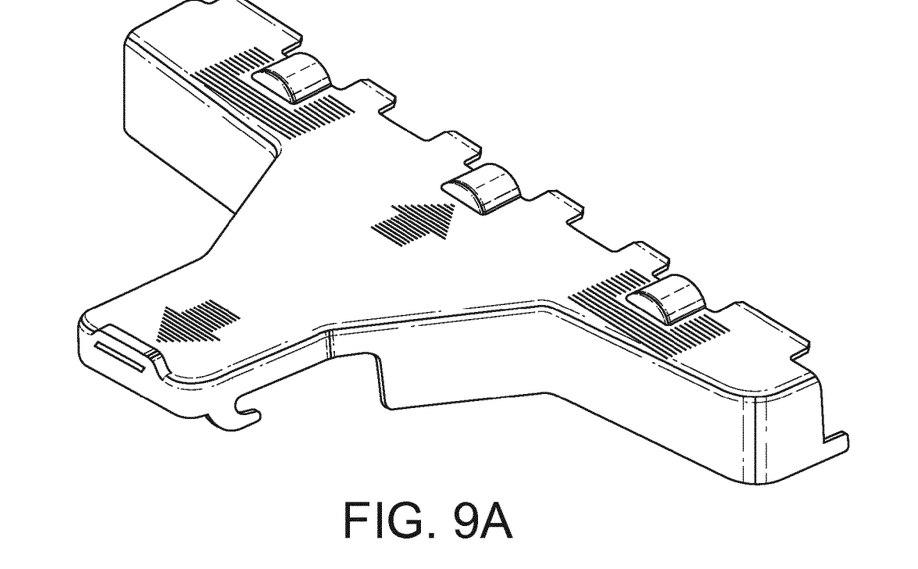
FIGS. 9A and 9B are perspective views of the cover of the drawer assembly of FIG. 3.
Figure 9B:
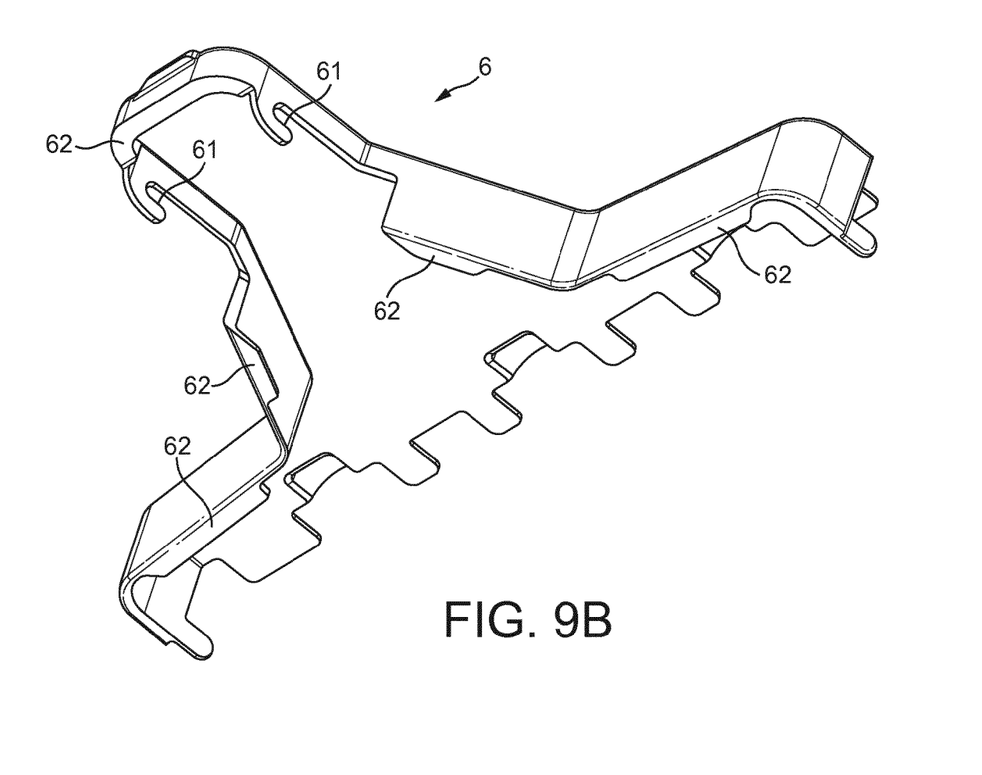

FIGS. 9A and 9B illustrate the cover 6 that has been detached from the drawer. The cover 6 is configured for covering the upper part of the drawer, at least a part of its lateral sides and at least a part of its bottom part. For the upper and lateral parts, the cover 6 can totally cover these parts of the drawer 4, whereas on the bottom part, it can present only several tabs 62 for maintaining and squeezing the two parts 4a, 4b of the drawer one against the other. Preferably these tabs are uniformly positioned along all the bottom surface of the cover. Consequently the pressure of the cover on the drawer is homogeneously spread over its whole surface and more particularly along all the length of the internal conduits of the drawer assembly. In order to lock the cover 6 around the drawer 4, the cover present two lateral notches 61 and the drawer presents two pins 63 (illustrated in FIG. 4) so that the pins can be positioned in the notches when the drawer assembly is assembled. The cover 6 guarantees a homogeneous squeezing pressure of the whole surface of the upper part against the whole surface of the lower part of the drawer.

Figure 10:
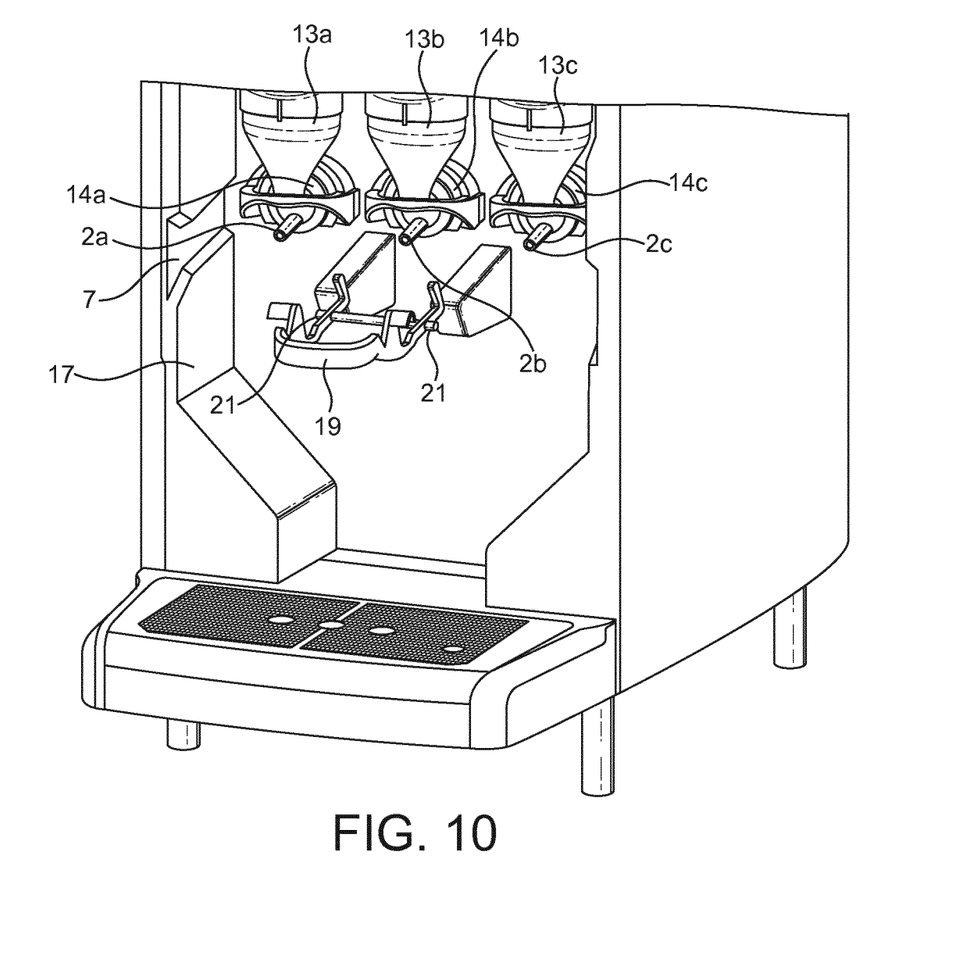
FIG. 10 is a perspective view of the internal part of the dispenser of FIG. 2 from which the drawer assembly has been removed.

FIG. 10 illustrate the dispenser from which the drawer assembly has been removed. The dispenser presents a receiving area 7 in its frame 17. The receiving area can consist in two lateral grooves hollowed out in the lateral sides of the frame in which the drawer assembly can be simply slide. The receiving area 7 is configured so that when the drawer assembly is positioned inside, the inlets 81a, 81b, 81c of the conduits in the drawer assembly cooperate with the outlets 2a, 2b, 2c of the mixing assemblies. The dispenser comprises a handle 19 attached to the frame at two symmetric pivot points 21 so that it can pivot around them in order to fix the drawer assembly in the receiving area. The handle 19 avoids that the drawer moves when it is positioned in the dispenser. It is also configured for pushing the drawer assembly against the mixing assembly outlets 2a, 2b, 2c, maintaining a pressure of one against the other and consequently guarantees a tightness connection of the drawer conduits and with the mixing assembly outlets. This tightness is reinforced by the fact that the inlets 81a, 81b, 81c of the conduits of the conduits in the drawer assembly are preferably surrounded by the second soft plastic material as illustrated in FIG. 6.

The receiving area is preferably configured so that when the drawer assembly is positioned inside, the conduits in the drawer assembly are slightly tilted downwards in order to facilitate the delivery of the beverage and also avoids the beverage deposits in the conduits. For example the conduits can be tilted according to an angle of at least 10°, preferably at least 15°, with horizontal.

During the cleaning operation the door of the dispenser is opened, the handle 19 is pivoted downwards and the drawer assembly 3 is removed by pulling and sliding it out of the receiving area 7. Then the cover 6 is removed by making it slide along the drawer 4. Finally the upper and lower parts 4a, 4b of the drawer are separated. At this step the operator can get access to the internal surfaces of the conduits—that are the grooves 50a, 50b, 50c, 51a, 51b, 51c—for cleaning.

The dispenser of the present invention presents the advantage of proposing an assembly for evacuating beverages from the mixing assembly that can be easily removed from the dispenser, dismantled and then cleaned.

Tubes are known for being difficultly cleanable without a mechanical friction in them—e.g. with a bottle-brush. The present invention proposes a solution for easily implementing this mechanical friction, e.g. with a wet sponge. The cleaning is made simple and easy for the operator.

Besides due to the properties of the first and second materials that constitutes the drawer assembly, the squeezing pressure exerted by the cover on the drawer and the force exerted by the handle on the connection between the drawer and the mixing assemblies outlets, an efficient tightness can still be maintained to guarantee that the quality of the beverage produced at the outlets of the mixing assemblies 1a, 1b, 1c is maintained until the outlets 80a, 80b, 80c of the conduits of the drawer. In particular the tightening between the upper and bottom parts of the drawer and between the drawer assembly and the mixing assembly outlet is so strong efficient that no air can enter in the beverage delivery conduits and affect the quality of the beverage prepared in the mixing assemblies.

Although the above detailed description relates to a dispenser implementing mixing assemblies, the present invention also applies to dispensers comprising other types of beverage ingredient processing assemblies for producing the beverage.

| | |
|---|---|
| 1, 1a, 1b, 1c | mixing assembly |
| 2, 2a, 2b, 2c | mixing assembly outlet |
| 3 | drawer assembly |
| 4 | drawer |
| 4a | drawer upper part |
| 4b | drawer lower part |
| 50a, 50b, 50c, 51a, 51b, 51c | groove |
| 6 | cover |
| 61 | notch |
| 62 | tab |
| 63 | pin |
| 7 | receiving area |
| 8, 8a, 8b, 8c | conduit |
| 80a, 80b, 80c | drawer assembly outlet |
| 81a, 81b, 81c | drawer assembly inlets |
| 9 | cup |
| 10 | beverage ingredient storing unit |
| 11 | dosing unit |
| 12 | diluent inlet |
| 13, 13a, 13b, 13c | dissolution chamber |
| 14, 14a, 14b, 14c | whipping chamber |
| 15 | whipping device |
| 16 | drive shaft |
| 17 | frame |
| 18 | motor |
| 19 | handle |
| 20, 201 | soft plastic material |
| 21 | pivot point |
| 22 | bump |
| 23 | slot |

The invention claimed is:
1. Beverage dispenser comprising:
at least one beverage ingredient processing assembly presenting one outlet for evacuating a beverage;

at least one conduit removably connected to the outlet of the at least one beverage ingredient processing assembly for dispensing the beverage in a container;

the dispenser comprises a drawer assembly comprising a drawer comprising an upper part and a lower part, both parts being at least partly removable one from the other, at least one of the parts presenting at least one groove on its internal surface so that when the two parts are connected together the at least one groove forms at least a part of the least one conduit for dispensing the beverage from the beverage ingredient processing assembly outlet to the container;

the upper part and the lower part of the drawer assembly are made of a first hard material; and a second soft polymer material covers a part of the internal surface of the upper and/or the lower part so that when the two parts are connected and squeezed together the part of the least one conduit formed by the at least one groove is liquid and air tight; and the drawer assembly comprises a cover for maintaining and squeezing the upper part and the lower part one against the other.

2. Beverage dispenser according to claim 1, wherein the at least one beverage ingredient processing assembly is a mixing chamber.

3. Beverage dispenser according to claim 1 wherein the lower part of the drawer comprises the outlet of the at least one conduit formed by the at least one groove.

4. Beverage dispenser according to claim 1 wherein the lower part of the drawer comprises the inlet of the conduit formed by the at least one groove.

5. Beverage dispenser according to claim 1 wherein only the lower part of the drawer assembly presents at least one groove on its internal surface.

6. Beverage dispenser according to claim 1 wherein the second soft polymer material covers the upper part and/or the lower part at least on the area near from the at least one conduit formed by the at least one groove.

7. Beverage dispenser according to claim 1 wherein the first hard material is selected from the group consisting of: metal, ceramic, and polymer.

8. Beverage dispenser according to claim 1 wherein the second soft polymer material is selected from the group consisting of: TPE, and silicone.

9. Beverage dispenser according to claim 1 wherein the cover is removably attached to the drawer.

10. Beverage dispenser according to claim 1 wherein the cover presents a member for removable attachment to the drawer.

11. Beverage dispenser according to claim 1, wherein the drawer presents two lateral pins and the cover presents two notches configured for cooperating with the two pins when the drawing assembly is assembled.

12. Beverage dispenser according to claim 1 wherein the dispenser comprises a receiving area for positioning the drawer assembly in the dispenser.

13. Beverage dispenser according to claim 1 wherein the dispenser further comprises a detachable connector for fixing the drawer assembly in the receiving area.

14. Beverage dispenser according to claim 1 wherein the detachable connector is configured for squeezing the drawer assembly against the outlet of the beverage ingredient processing assembly.

15. Beverage dispenser according to claim 12 wherein the detachable connector is a handle pivotably mounted to the frame of the dispenser at two symmetric pivot points.

16. Beverage dispenser according to claim 1, wherein the handle is configured for engaging the front of the drawer assembly.

* * * * *